July 27, 1943.  R. T. CORNELIUS  2,325,228
BEVERAGE DISPENSING APPARATUS
Filed Oct. 11, 1940  5 Sheets-Sheet 1

Inventor
Richard T. Cornelius
By Caswell & Lagaard
Attorneys

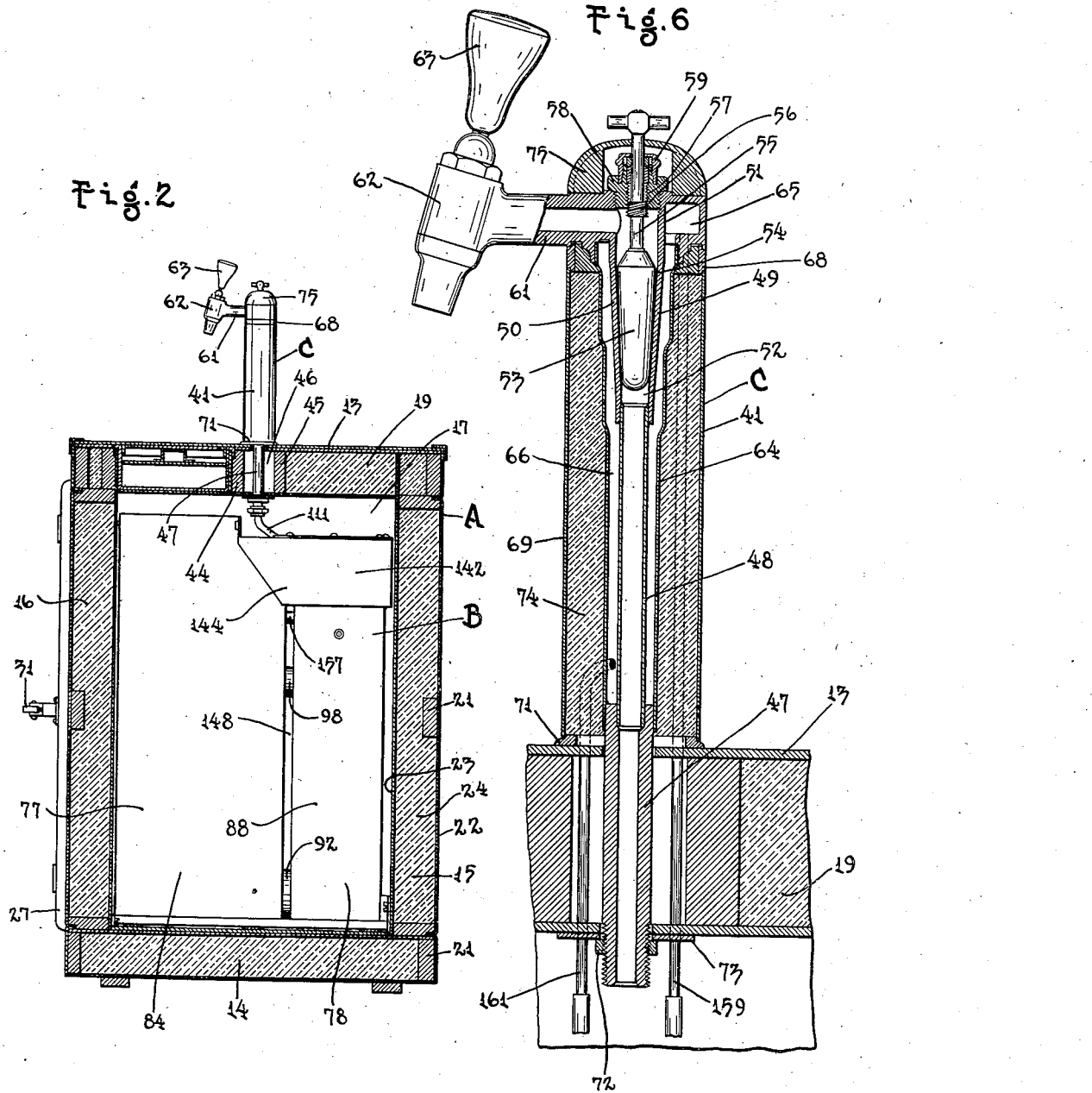

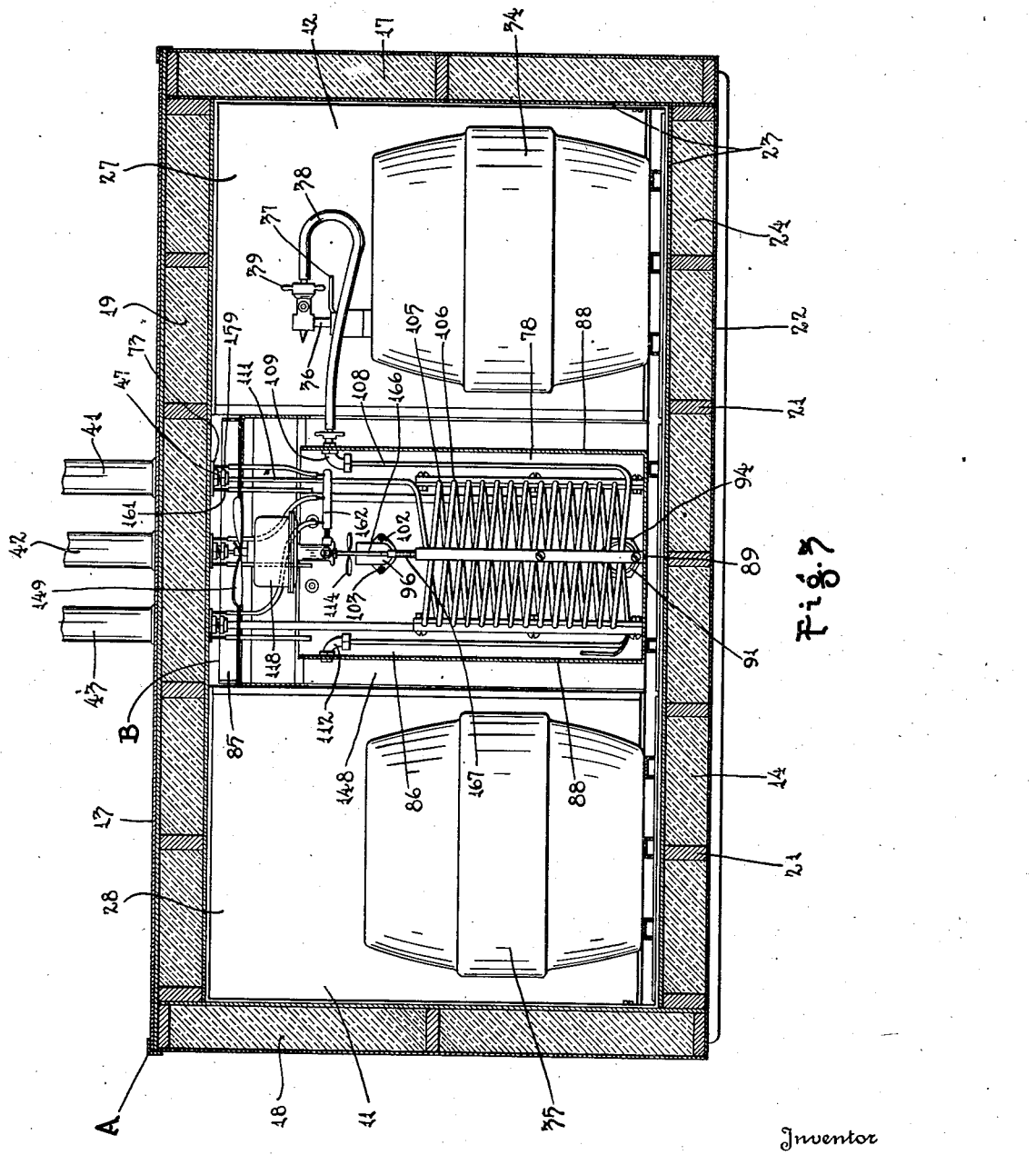

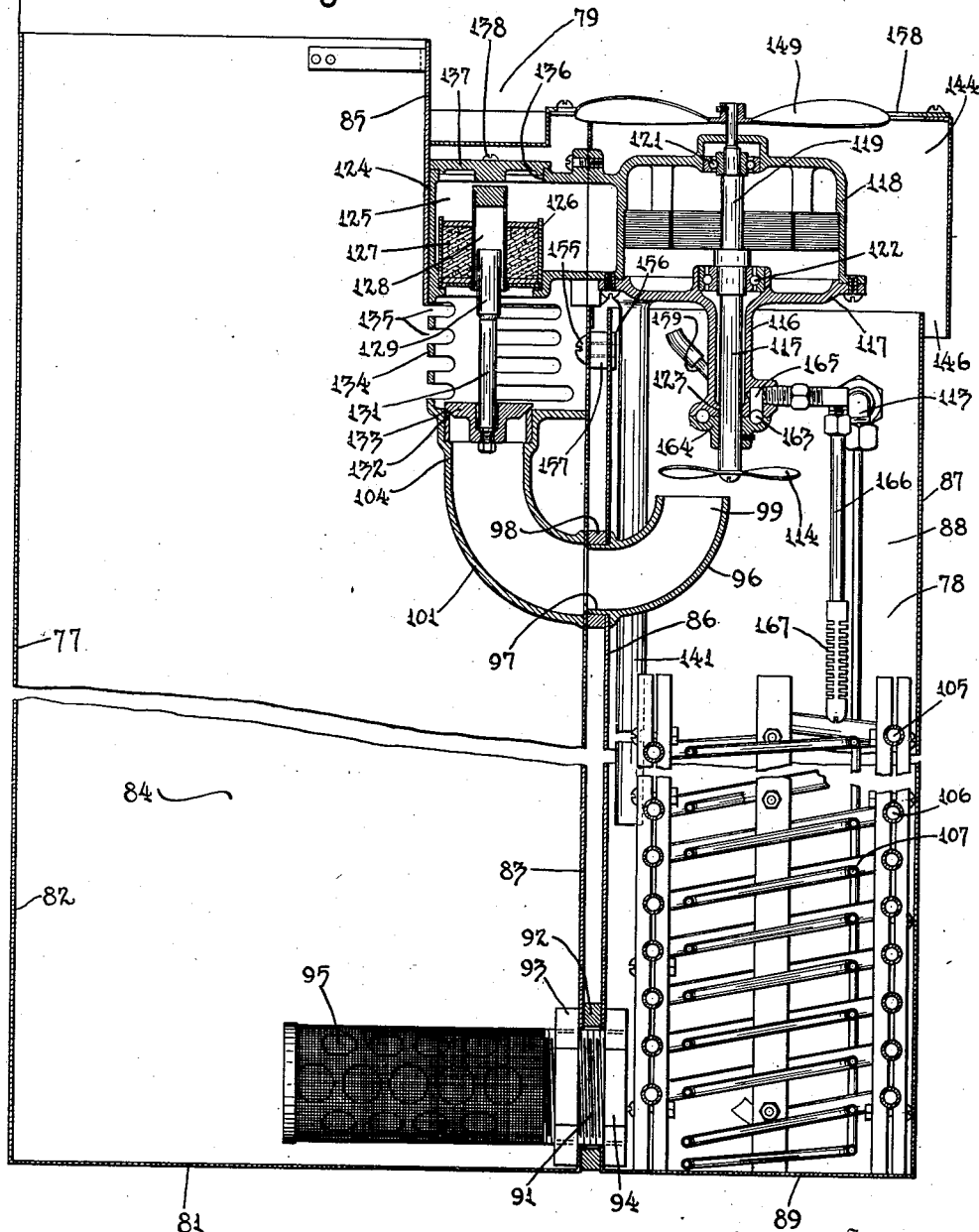

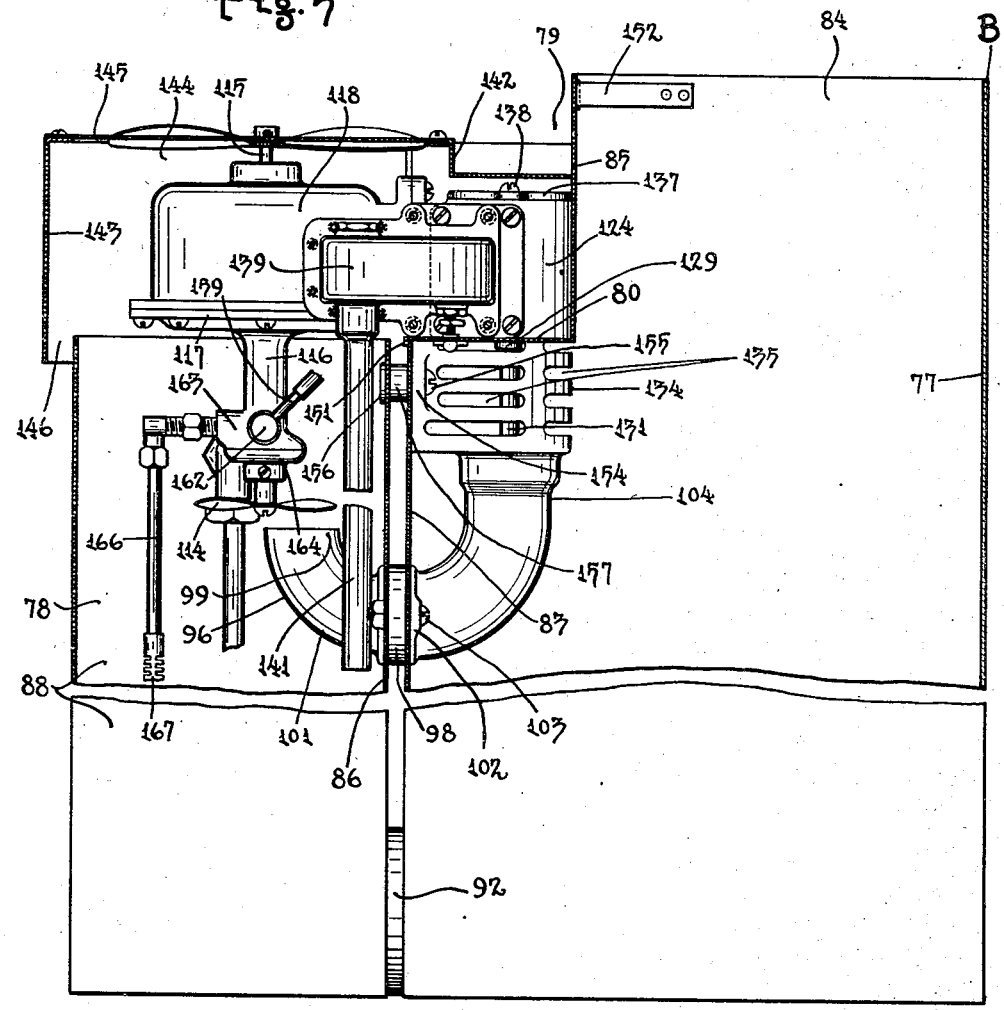

Patented July 27, 1943

2,325,228

UNITED STATES PATENT OFFICE 2,325,228

BEVERAGE DISPENSING APPARATUS

Richard T. Cornelius, Minneapolis, Minn.

Application October 11, 1940, Serial No. 360,813

5 Claims. (Cl. 62—141)

My invention relates to beverage dispensing apparatus and has for an object to provide an apparatus by means of which beverages such as beer and the like may be maintained in palatable condition prior to being dispensed.

Another object of the invention resides in providing a dispensing apparatus in which the temperature of the beer drawn will be proper regardless of the lapse of time between uses of the apparatus.

Another object of the invention resides in providing an apparatus in which the container for the beer is cooled, as well as the beer leaving the same.

A feature of the invention resides in providing an apparatus utilizing a dispensing column having a conduit leading from the beverage container and in providing means for maintaining said conduit cool.

Another object of the invention resides in providing a cabinet and in disposing within said cabinet a cooling unit dividing the same into one or more compartments for the reception of containers for the beverage.

An object of the invention resides in constructing the cooling unit with a storage tank for cooling the liquid and a heat exchange tank connected therewith.

A still further object of the invention resides in providing a heat exchange conduit within the heat exchange tank adapted to be connected to a beverage container and to a faucet.

Another object of the invention resides in providing a single impeller for circulating the cooling liquid within said heat exchange tank and for causing transfer of cooling liquid from the storage tank to the heat exchange tank.

Another object of the invention resides in providing a fan for causing circulation of the air within the cabinet past the cooling unit to cool the beverage container.

A still further object of the invention resides in providing means for circulating cooling liquid about the conduits within the columns of the dispensing devices.

A still further object of the invention resides in providing a single motor for procuring operation of the impeller, fan and the cooling liquid circulating means.

An object of the invention resides in connecting the two tanks together through a conduit having an upwardly extending open end positioned in proximity to the impeller whereby the impeller is caused to both circulate cooling liquid within the heat exchange tank and to cause transfer of cooling liquid through said conduit and into the storage tank.

Another object of the invention resides in providing thermostatic valve control means responsive to the temperature in the heat exchange tank for controlling the flow of cooling liquid through said conduit.

Other objects of the invention reside in the novel combination and arrangement of parts and in the details of construction hereinafter illustrated and/or described.

In the drawings:

Fig. 2 is an elevational sectional view taken on line 2—2 of Fig. 1.

Fig. 3 is a longitudinal elevational sectional view taken on line 3—3 of Fig. 1.

Fig. 4 is a cross sectional view of the cooling unit of the invention removed from the cabinet and taken on line 4—4 of Fig. 1, said view being drawn to a greater scale.

Fig. 5 is a view similar to Fig. 4 viewed from the opposite side of the cooling unit and showing a portion of the cooling unit in elevation.

Fig. 6 is an elevational longitudinal sectional view of the dispensing device of the invention drawn to a greater scale.

Fig. 7 is a partial cross-sectional view of a corner of the cooling unit B.

Figure 1:
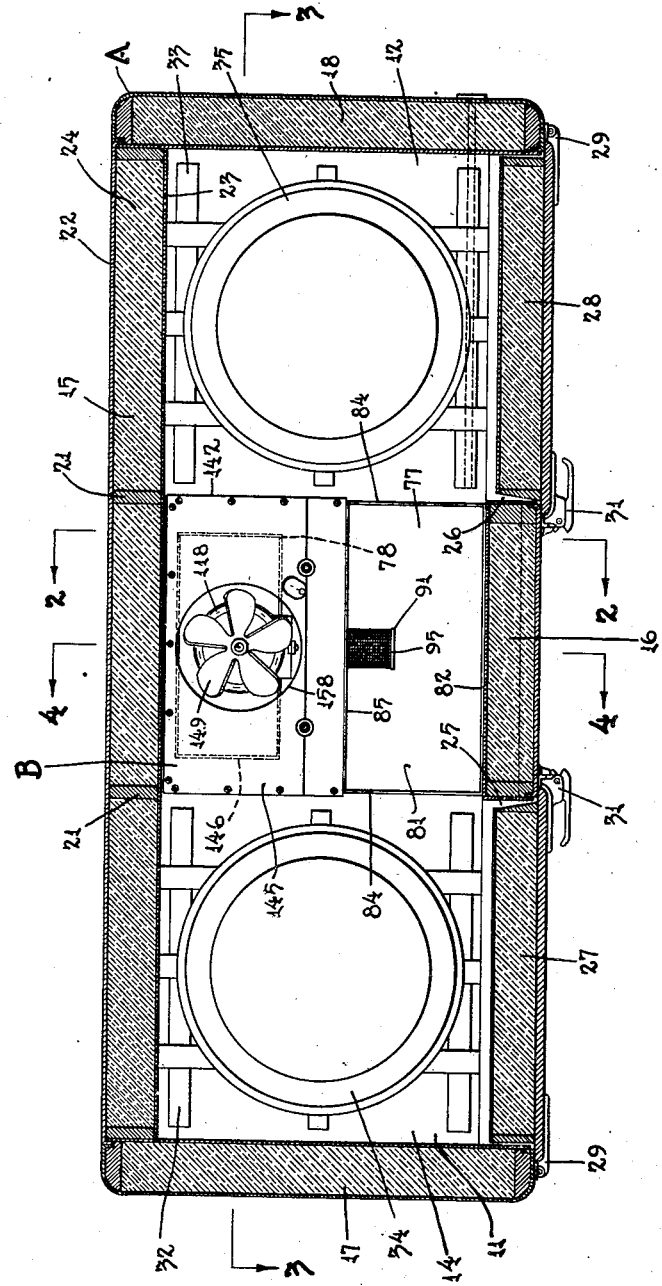
Fig. 1 is a plan sectional view of a beverage dispensing apparatus illustrating an embodiment of my invention.

My invention comprises a cabinet illustrated in its entirety by the reference character A, which cabinet has mounted in it a cooling unit B, situated intermediate the ends of the cabinet and forming storage compartments 11 and 12 on opposite sides thereof in which kegs or containers containing the beverage to be dispensed may be placed. Connected to the cooling unit B is a dispensing device C, which projects upwardly from the upper surface of the cabinet A, which forms a counter indicated by the reference numeral 13. These various parts will now be described in detail.

The cabinet A consists of a bottom 14, a rear wall 15, a front wall 16 and end walls 17 and 18. These various walls are connected together by means of a top 19 which forms the counter 13. The various walls of the cabinet may be constructed in any suitable manner, as for example by means of frame members 21 which form a framework for supporting a tubular shell 22 and an inner liner 23 spaced therefrom. Between this shell and liner is provided insulation 24, whereby the transfer of heat from the exterior of the cabinet to the interior is greatly reduced. The wall 10 of the cabinet is provided with two openings 25 and 26, which give access to compartments 11 and 12. These openings are adapted to be closed by means of doors 27 and 28, which are hingedly connected by means of hinges 29 to the wall 10 and which may be latched by means of suitable latches 31. The particular construction of the cabinet proper, forming no particular feature of the invention, has not been shown in detail in the drawings and it will be readily comprehended that any customary construction may be used for the purpose.

Within the two compartments 11 and 12 are mounted racks 32 and 33 which rest upon the bottom 14 and which are adapted to support the beverage containers or barrels from which the beverage is to be dispensed. In the Figs. 1 and 3 two barrels 34 and 35 for beer or any other suitable beverage is shown. The various connections for the beer lines leading from these barrels have not been illustrated in Fig. 1, and have only been shown in connection with the barrel 34 in Fig. 3. These connections are of standard form and consist of a tap rod 36 adapted to be forced into the barrel and held attached thereto by means of a clamp 37. A hose 38 is connected to the discharge end of the tap rod and the beer entering the same is controlled by means of a suitable valve 39. This hose is connected to the cooling unit B in a manner to be presently described in detail.

The dispensing device C consists of three columns 41, 42 and 43, which are used for dispensing the beer in the two barrels 34 and 35 and also for the purpose of dispensing water. The column 41 has been illustrated in detail in Fig. 6 and will now be specifically described. In the top 19 of the cabinet A are provided two spaced longitudinally extending frame members 44 and 45 which provide a space 46 therebetween. Extending through this space is a thick walled tube 47 which has secured to the same at its upper end a thin walled tube 48. Attached to the upper end of the tube 48 is a flow restrictor 51 which is formed with a housing 49 having a conical tubular portion 50. The lower end of this tubular portion is directly secured to the tube 48. The housing 49 has a conical bore 52 within the conical tubular portion 50 thereof in which is inserted a conical core 53. This core forms with the wall of the bore 52 a restricted passageway 54 through which the beer or other beverage to be dispensed passes. The core 53 has attached to it a stem 55 which has a threaded portion 56 screwed into threads 57 in a cap 58 secured to housing 49. A stuffing box 59 forms a fluid-tight connection between the stem 55 and housing 49 and prevents leakage of the beer outwardly of the device. The housing 49 has connected to it a neck 61 which communicates with a faucet 62 having an operating handle 63, by means of which the beer may be drawn from the barrel.

Encircling the thin walled tube 48 and the portion 50 of the housing 49 having the conical bore 52 therein is a jacket 64. This jacket is secured at its lower end to the upper end of the thick walled tube 47 and at its upper end to the housing 49, and forms in conjunction with the tube 48 an annular passageway therebetween. A passageway 65 in the housing 49 partly surrounds the conical tubular portion 50 of said housing and communicates with the passageway 66 formed between the jacket 64, the tube 48, and the lower part of the portion 50 of the housing 49. All of theese various parts may be secured together by soldering, brazing or in any other suitable manner, to form a fluid-tight passageway both around the tube 48 and through the same.

Encircling the upper end of the jacket 64 is a collar 68 which is seated against the under side of the portion of the housing 49, forming the neck 61 and the passageway 65. This collar is recessed to receive a tubular shell 69 encircling the jacket 64. The shell 69, at its lower end, is seated in another collar 71 which rests upon the counter 13 of top 19. A nut 72 threaded upon the lower end of the thick walled tube 47 and bearing against a washer 73 disposed upon the under side of the top 19 serves to draw the entire column downward and retain the tubular shell 69 seated in the collars 68 and 71. In the space between the shell 69 and the jacket 64 is placed insulation designated by the reference numeral 74. A cap 75, secured upon the upper portion of the housing 49 crowns the same.

The cooling unit B consists of a storage tank 77 for cooling liquid and another tank 78 for heat exchange. These two tanks are disposed adjacent one another as shown in Figs. 1 and 4 and divide the interior of the cabinet A so as to form the two compartments 11 and 12. The tank 78 is of lesser width, length and height than the tank 77, as shown in Fig. 1. In the uppermost portion of the tank 77, adjacent the tank 78, is formed a niche indicated by the reference numeral 79.

The tank 77 is constructed with a bottom 81, a rear wall 82, a front wall 83 and side walls 84 connected therewith, being open at the top. The two side walls 84 are notched to form the niche 79. In this niche is disposed a removable partition 85 which has attached to it a shelf 80. This shelf is bent outwardly from the partition and is constructed with a lip 151 at its forward edge. The said lip is adapted to extend over the uppermost edge of the wall 83 of tank 77 at its upper edge. The partition 85 is held in place at its upper end by means of abutments 152 secured to the side walls 84 of tank 77. This construction is best shown in Fig. 5.

The tank 78 is constructed with a rear wall 86 positioned adjacent to the wall 83, but spaced therefrom. The said tank is further formed with a front wall 87, side wall 88 and a bottom 89 connected to the various lateral walls thereof. The two tanks 77 and 78 are in communication with one another at their lower ends by means of a nipple 91 which extends jointly through both of the walls 83 and 86 of said tanks. A gasket 92 is situated between the two walls. Nuts 93 and 94 screw upon the nipple 91 and form a fluid-tight connection between the two walls, whereby cooling liquid may circulate from the tank 77 and into the tank 78. A strainer 95 of any desired form is attached to the end of the nipple 91 extending into the tank 77 and serves to prevent solid matter from entering into the tank 78.

The upper portions of the two tanks 77 and 78 are brought into communication by means of an elbow 96 which has a neck 97 extending through the two walls 83 and 86 of said tanks. A gasket 98, similar to the gasket 92 is disposed between the walls 83 and 86 and circles the neck 97. The elbow 96 is disposed within the tank 78 and is arranged so that the free end 99 thereof faces upwardly. Within the tank 77 is disposed another elbow 101 similar to the elbow 96 which has one end thereof concentrically arranged with reference to the neck 97 and which communicates with the elbow 96. The two elbows are constructed with flanges 102, which are bolted together by means of bolts 103. In this manner, a fluid-tight connection is formed between the two tanks 77 and 78, which permits of the flow of cooling liquid from one tank to the other through the two elbows 96 and 101. The elbow 101 is arranged with its free end 104 extending upwardly.

Within the tank 78 are located three heat exchange conduits or coils 105, 106 and 107. The coils 105 and 106 are both helical and disposed adjacent one another. The coil 106 is provided with an inlet tube 108 which is connected to a fitting 109 by means of which the hose 38 of the tap rod 36 may be connected to the said coil. The other end 111 of the said coil extends upwardly and is connected to the tube 47 of the column 41, whereby beer may be led from the barrel 34 through the coil 106 and dispensed from the faucet 62. The coil 105 is similarly connected to a fitting 112 by means of which the barrel 35 may be connected to the said coil 105 and with the tube 47 of the column 43. In this manner, beer may be dispensed from either of the columns 43 or 41 connected to the respective barrels. The heat exchange coil 107 is connected at one end to a fitting 113 which is adapted to be connected to a water supply pipe and at its other end is connected to the tube 45 of the column 42. By means of this connection cold water may be dispensed from the column 42.

For the purpose of cooling the heat exchange coils 105, 106 and 107, the tank 77 is filled up to level of the uppermost portion of the wall 83 with ice and water. The cooling liquid passes through the strainer 95 and nipple 91 and into the tank 78 where the same circulates throughout the tank 77, cooling the respective heat exchange coils.

In order to promote circulation of cooling liquid in the tank 77, an impeller 114 is employed which is connected to a shaft 115 rotatably mounted in a housing 116 formed on the end bell of a motor 118. The shaft 115 is directly connected to the armature shaft 119 of the said motor which is itself journaled in bearings 121 and 122. The shaft 115 is further journaled in a bearing 123 formed in the lower portion of the housing 116.

The shaft 115 is located so that the axis of the same is above one edge of the free end 99 of the elbow 96, and so that a portion of the impeller 114 overlies the said edge of the elbow, the remainder of the impeller being disposed outwardly thereof. When the motor shaft 115 is operated the cooling liquid in the tank 78 is forced through the elbow 96 and through the elbow 101 and into the upper portion of the tank 77. This causes cooling liquid to pass through the strainer 95 and nipple 91 and into the lowermost portion of the tank 78 through which the cooling liquid rises, cooling the coils 105, 106 and 107 in its upward travel. At the same time re-circulation of the liquid in the tank 77 is brought about by the portion of the impeller 114 situated exteriorly of the free end 99 of elbow 96.

Situated in the niche 79 is a housing 124 which is supported as will be hereinafter described. The housing 124 has a chamber 125 in it in which is situated an electromagnet 126. This electromagnet is provided with a coil 127 encircling a tube 128 at the center of the same. Slidable in the tube 128 is a core 129 which is adapted to be attracted by the magnet when the magnet is energized and which is drawn up into the magnet. The core 129 has connected to it a valve stem 131 which carries a valve head 132 adapted to engage a valve seat 133 formed at the upper portion 104 of elbow 101. A guard 134 encircles the valve stem 131 and extends up to the shelf 80. This guard is constructed with a number of openings 135 in the same which bring the passageway through the valve and the upper end 104 of elbow 101 into communication with the tank 77. By means of this construction ice is prevented from coming in contact with the valve and operating mechanism connected therewith.

It will be readily comprehended that, when the valve head 132 is raised, water may circulate through the elbows 96 and 131 from tank 78 to tank 77 and that, when the said valve is closed, the impeller 114 merely churns the cooling liquid within the tank 78.

The elbow 101, the guard 134 and the housing 124 are all constructed integral. This structure is partly supported through the flanges 102 of the elbows 96 and 101 and the bolts 103 which project therethrough. For further supporting the said structure, the guard 134 is provided with two ears 154 which extend outwardly therefrom and overlie the wall 83 of tank 77. Extending through these ears are screws 155 which screw into threaded bushings 156 brazed to the wall 86 of tank 78. Gaskets 157 are disposed between these walls and form a fluid-tight connection between the two tanks. The motor 118 is attached to the housing 124 and supported thereby.

The upper portion of the housing 124 is constructed with an opening 136 opposite the electromagnet 126 which is adapted to be covered by a closure 137 attached to said housing by means of screws 138. The opening 136 gives access to the electromagnet 126.

Attached to the housing 124 is a thermostat 139. This thermostat includes a thermally responsive element 141 which extends down into the cooling liquid in the tank 78 in proximity to the upper portions of the coils 105 and 106. The said thermostat further includes a switch, not shown, which is connected in the circuit operating the electromagnet 128. When the temperature in the tank 78 drops, thermostat 139 operates in a manner to close the circuit through the electromagnet 126 which raises the valve 132. The motor 118 runs continuously and as soon as the said valve is open the impeller 114 forces the cooling liquid through the elbows 96 and 101 and procures circulation of cooling liquid from one tank to the other.

Overlying the motor 118, the housing 124 and the thermostat 139 is a hood 142. This hood is constructed with a front wall 143, side walls 144, and a top 145 connected thereto. The said hood is attached to the tank 77, the walls 144 of said hood being substantially co-planar with the walls 84 of the tank 77. Walls 144 and 143 of the said hood are spaced from the walls 88 and 87 of the tank 78, whereby a passageway 146 is formed therebetween. Due to the construction of the two tanks 77 and 78, a space 148 is provided which extends completely around the tank 78 and which communicates with the passageway 146. This space, as will become evident from Fig. 3, communicates with the two compartments 11 and 12 in the cabinet A. The uppermost end of the shaft 115 extends above the motor 118 and has attached to it a fan 149. This fan is disposed in an opening 158 in the cover 145 and causes circulation of air in an upward direction. When the motor 118 is put in operation air is drawn from the uppermost portion of the two compartments 11 and 12 and directed downwardly through the passageway 146 in hood 142 and along the walls of the tanks 77 and 78, particularly the tank 78. This air is then discharged outwardly into the cabinet A at the lowermost portions of the compartments 11 and 12. Thus the air within the entire cabinet is circulated and cooled so as to prevent appreciable heat loss from the barrels within the cabinet.

The passageway 66 in the housing 49 of each of the columns 41, 42 and 43 has connected to it a tube 159. Similarly the lowermost portions of the jackets 64 have connected to them tubes 161. The tubes 161 have open ends and are adapted to discharge into the uppermost portion of the tank 78. The ends of the tubes 159 are connected to a manifold 162 which in turn is directly connected to the discharge end of a water circulating pump 163. Water circulating pump 163 is formed partly by the lower end of the housing 116 and a revoluble head 164 connected to the shaft 115 and revoluble therewith. Said pump is of the centrifugal type and has an inlet passageway 165 connected to an intake pipe 166 extending downwardly into the cooling liquid within the tank 78. This pipe has connected to the lower end thereof a strainer 167 by means of which extraneous matter is prevented from entering the pump. When the motor 118 operates, water is circulated by the pump 163 and forced through the passageways 66, and cools the tube 48 and the flow restrictor 51.

The operation of my invention is as follows: The motor 118 has a low power consumption and is caused to operate continuously during operation of the dispensing apparatus. This motor causes circulation of the air within the cabinet A by operating fan 149 which circulates the air drawing the same from the upper portion of both of the compartments 11 and 12 directing the same downwardly along the sides of the tank 78 and discharging the same at the bottom of the compartments 11 and 12 in a direction towards the beverage containers or barrels 35 or 34. In this manner the air in the interior of the cabinet is circulated and the beverage containers themselves cooled. During operation of the motor 118 the impeller 114 and the pump 163 are in operation. The impeller 114 causes circulation of the cooling liquid within the tank 78, thereby procuring cooling of the coils 105, 106 and 107. If the valve head 132 is open cooling liquid flows through the elbows 96 and 101 and into the tank 77. This causes return flow of cooling liquid through the nipple 91 and into the bottom of the heat exchange tank 78. When the valve head 132 is closed, the impeller merely churns the cooling liquid above the elbow 96 and at the same time circulates the cooling liquid within the tank 78. If the temperature in the tank 78 rises, the thermally responsive element 141 of thermostat 139 functions to operate the thermostat which completes a circuit through the coil 127 of the electromagnet 126. This raises the core 129 and the valve head 132 connected to it through valve stem 141 and allows the cooling liquid to travel through the two elbows 96 and 101 and into the upper portion of the tank 77 through the openings 135 in guard 134. Circulation of cooling liquid between the two tanks is now established and the temperature in the tank 78 readily reduced the desired amount. During operation of the motor 118 cooling liquid is continuously circulated by the pump 163 throughout the passageways about the tubes 48 of the various columns 41, 42 and 43. It will thus be readily comprehended that, as beer or other beverage is drawn from the faucet 62, the beer is suitably cooled and no waste of beer occurs before beer of proper temperature is drawn.

The advantages of my invention are manifest. The device is particularly adapted for use with ice and will maintain the heat exchange conduits at the proper temperature. The apparatus is extremely efficient in operation and only requires a single small motor which actuates all of the moving parts of the apparatus. Cool beverage can at all times be drawn from the apparatus without waste of beverage. With my invention the differences in temperatures between the various parts of the apparatus is a minimum and the temperature readily and easily held at the desired degree. My improved apparatus is extremely simple in construction and will not readily get out of order.

Changes in the specific form of my invention, as herein disclosed, may be made within the scope of what is claimed without departing from the spirit of my invention.

Having described my invention, what I claim as new and desire to protect by Letters Patent is:

1. In combination, a cabinet for the reception of a beverage container, a heat exchange conduit within said cabinet adapted to be connected to the beverage container and to a faucet, a tank for cooling liquid, said heat exchange conduit being disposed within said tank, a vertically extending shaft projecting downwardly into said tank, an impeller on said shaft, said shaft projecting above the tank, a fan attached to said shaft at a locality above the tank, said impeller circulating the cooling liquid within the tank and said fan circulating the air above the tank, from the cooling liquid and to the beverage container and a motor operating said shaft.

2. In combination, a cabinet for the reception of a beverage container, a tank within said cabinet for a cooling liquid, a heat exchange conduit within said tank adapted to be connected to said beverage container, a conduit leading from said heat exchange conduit outwardly of said cabinet, a faucet connected to said second named conduit, a jacket encircling said second named conduit and forming a passageway encircling said second named conduit, a shaft extending partly within said tank and disposed partly outwardly of said tank, an impeller on the shaft within said tank for circulating the cooling liquid therein, a pump on said shaft connected to said passageway for circulating cooling liquid about said second named conduit, a fan on the portion of the shaft situated exteriorly of the tank for circulating the air within the cabinet, from the cooling liquid and to the beverage container and a motor for operating said shaft.

3. In combination, a cabinet for the reception of a beverage container, a storage tank within said cabinet for cooling liquid, a heat exchange tank within said cabinet connected to said storage tank, a heat exchange conduit within said heat exchange tank adapted to be connected to the beverage container and to a faucet, and a fan disposed above said heat exchange tank and adapted to direct air from the top of the cabinet downwardly along said heat exchange tank and toward said beverage container.

4. In combination, a cabinet for the reception of a beverage container, a storage tank within said cabinet for cooling liquid, a heat exchange tank within said cabinet connected to said storage tank, a heat exchange conduit within said heat exchange tank adapted to be connected to the beverage container and to a faucet, an impeller within said heat exchange tank adapted to cause circulation of cooling liquid within said heat exchange tank and transfer of cooling liquid from said storage tank and to said heat exchange tank, thermostatically operated valve means controlled by the temperature in the heat exchange tank for controlling the flow of cooling liquid from the storage tank to the heat exchange tank, a fan disposed above said heat exchange tank and serving to draw air from the upper portion of the cabinet and direct the same downwardly along said heat exchange tank and toward said beverage container, and a motor for operating both said impeller and fan.

5. In combination, a cabinet, a cooling unit within said cabinet arranged within the same to form a compartment therein for the reception of a beverage container, said cooling unit including a tank for cooling liquid, said tank falling short of the uppermost portion of the cabinet to provide a space thereabove, a fan disposed within said space and adapted to draw air from the upper portion of said compartment and direct the same downwardly along said tank and into the compartment at the lowermost portion thereof for cooling the beverage container within the compartment, and a hood encircling said fan and the upper portion of said tank, said hood being spaced from said tank to form a passageway for directing the air drawn by the fan along the walls of said tank.

RICHARD T. CORNELIUS.